J. H. SIEVERS & H. T. WINKLER.
Wrench.

No. 204,386. Patented May 28, 1878.

Witnesses.
Eggert Sievers
John E. Cass

Inventor.
Jacob H. Sievers
Henry T. Winkler
By Johnstone & Cass

UNITED STATES PATENT OFFICE.

JACOB H. SIEVERS AND HENRY T. WINKLER, OF VALPARAISO, INDIANA.

IMPROVEMENT IN WRENCHES.

Specification forming part of Letters Patent No. 204,386, dated May 28, 1878; application filed March 18, 1878.

*To all whom it may concern:*

Be it known that we, JACOB H. SIEVERS and HENRY T. WINKLER, both of Valparaiso, Porter county, Indiana, have invented a new and useful Improvement in Wrenches; and do hereby declare that the following is a full, clear, and exact description of the same.

The object of our invention is to provide a wrench the jaws of which will be easily and readily adjustable in the shank, and which will be simple in construction and durable and efficient in use.

Our invention therein consists, first, in a peculiar adjustable dog, having a rocking motion on the shank of the wrench, attached to the end of the movable jaw of the wrench, and provided with a tooth at one end to engage with notches on the shank of the wrench, and at the other end with a spring to retain said tooth in such notches; and, further, in the combination, construction, and arrangement of the operative parts of our wrench, as fully hereinafter explained.

Figure 1:
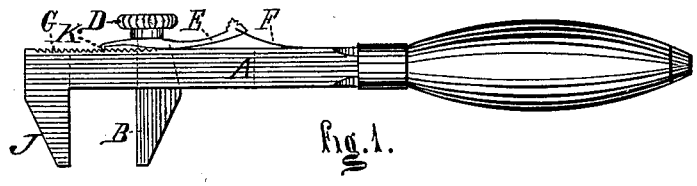
Figure 5:
Figure 6:
Figure 3:
Figure 4:
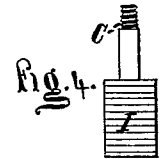
Figure 2:
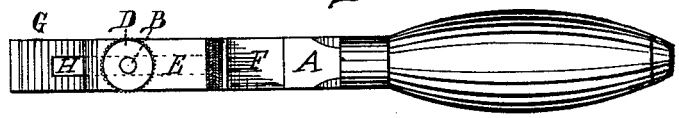

In the drawings, Figure 1 is a side view of the entire device; Fig. 2, a top view; Fig. 3, a separate side view of a corrugated jaw, and Fig. 4 an end view of the same.

Like letters show corresponding parts.

A represents the shank of the wrench, provided with a suitable handle or gripe. The shank A is furnished with a slot, H, which extends about an equal distance from the center toward each end.

J represents the stationary jaw at the end of the shank, to which the slot H extends, so that the two jaws employed can be brought together.

The top of the shank A is notched, as shown at G, on both sides of the slot a sufficient distance from the end of the shank to allow the movable jaw, hereinafter described, to be moved back to the extreme end of the slot.

B is the movable jaw, which is cut away to form a shank, of the width of the slot H, and at the top of this shank is a short screw-threaded end. This jaw may have a plain face, as shown in Fig. 1, or the face may be notched or corrugated, as shown in Fig. 3, where I represents the jaw, and C the screw-thread at the top thereof. The movable jaw and its shank are shaped like a double wedge, with the straight edge toward the stationary jaw J.

E is a movable dog of the shape shown in Fig. 1, so that it will have a rocking movement on the shank of the wrench, having a tooth, K, which engages with the notches in the top of the shank A. The dog E is of the same width as the top of the shank A, and its length is a little less than that of the series of notches on such shank, so that when the tooth K is placed in the notch at the end of the shank A, the springs F, which are secured to the lower side of the dog in a notch or recess at the opposite end from the tooth K, will have their free ends extended beyond the corrugations G, and rest against the top of the shank, where they hold the tooth K with an elastic pressure in the desired notch.

The dog E is provided with a wedge-shaped opening of the width of the shank of the movable jaw B, and the screw-threaded end of the jaw B and its wedge-shaped shank are passed through the opening in the dog, so that the screw-threaded portion projects beyond and above said dog. A thumb-nut, D, is placed upon the screw-threaded end, (a washer having been previously placed thereon,) by loosening which the dog can be adjusted as desired.

The wedge-shaped shank of the movable jaw and the screw-threaded end thereof play loosely in the slot in the dog E, so that when any article is placed between the jaws the lower part of the movable jaw is moved back a little, thus moving the dog forward enough to permit the tooth K to engage with one of the notches, where it is held by the spring. Then, when the nut is tightened, the jaw is brought up against the article being held, which it holds very tightly.

In operation, the article to be held is placed between the jaws, and the thumb-nut being loosened, the movable jaw is advanced and placed against the object, and the tooth K placed in one of the notches. Then the nut is tightened, and, as before explained, the movable jaw is brought up tightly against the object, which will be securely held.

What we claim is—

1. In a wrench, the adjustable dog E, having a rocking motion on the shank of such wrench, and provided with a wedge-shaped opening to receive the end of the movable jaw B, and having at one end the tooth K, and at the other the spring F, substantially as and for the purposes set forth.

2. In a wrench, the combination of the shank A, having slot H and notches G, the stationary jaw J, movable jaw B, and the dog E, having tooth K and spring F, all constructed, arranged, and operated substantially as described and shown.

JACOB H. SIEVERS.
     HENRY T. WINKLER.

Witnesses:
 JOHN E. CASS,
 EGGERT SIEVERS.